No. 648,398. Patented May 1, 1900.
O. W. EVERETT.
ROLLER SKATE.
(Application filed Jan. 28, 1899.)
(No Model.)
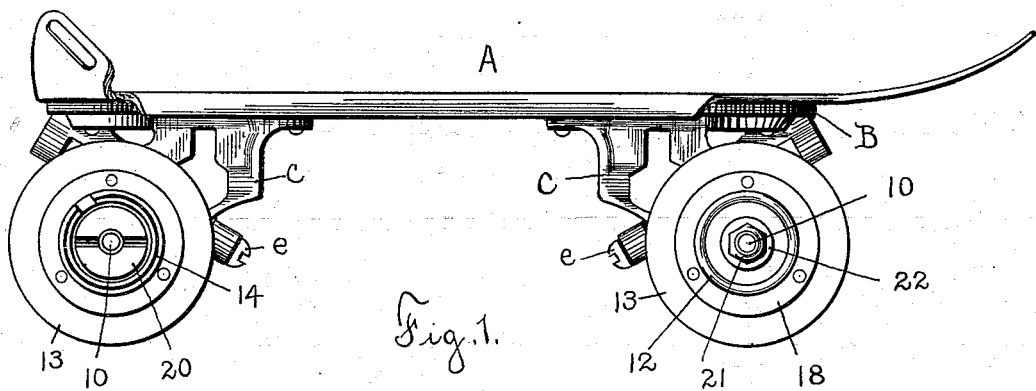
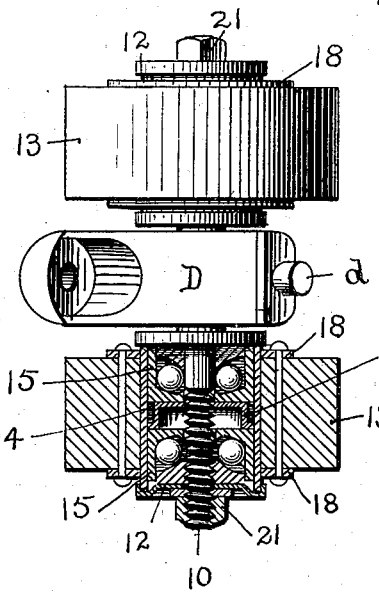
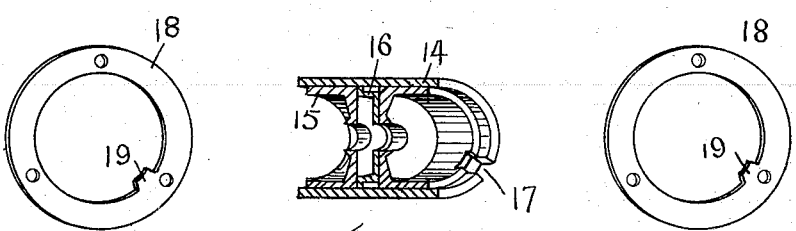
Witnesses:
Harry M. Rugg
M. O. Ragan.
Inventor
O. W. Everett
By Attorneys
Southgate & Southgate

UNITED STATES PATENT OFFICE.

OTIS W. EVERETT, OF WORCESTER, MASSACHUSETTS, ASSIGNOR TO THE SAMUEL WINSLOW SKATE MANUFACTURING COMPANY, OF SAME PLACE.

ROLLER-SKATE.

SPECIFICATION forming part of Letters Patent No. 648,398, dated May 1, 1900.

Application filed January 28, 1899. Serial No. 703,669. (No model.)

*To all whom it may concern:*

Be it known that I, OTIS W. EVERETT, a citizen of the United States, residing at Worcester, in the county of Worcester and State of Massachusetts, have invented a new and useful Roller-Skate, of which the following is a specification.

The object of my present invention is to provide a simple, inexpensive, and attractive form of roller-skate; and the especial object of my invention is to provide an improved form of skate-wheel in which the ball-casings will be supported and locked in place in a rigid and efficient manner and to provide an improved construction for excluding dust from the bearings.

To these ends my invention consists of the skate-wheels, as hereinafter described, and of the combinations of parts, as hereinafter more particularly pointed out in the claim at the end of this specification.

In the accompanying drawings, Figure 1 is a side view of a roller-skate constructed according to my invention, one of the rear dust-washers being removed. Fig. 2 is an enlarged plan view, partially in section, of a rocker and skate-wheels carried thereby; and Fig. 3 is a perspective view, partially in section, illustrating the pieces employed for supporting and locking the ball-casings in the skate-wheels.

To journal a skate-wheel or ball-casings so that the same will always run substantially true, it is essential that the ball-casings should be locked in the wheel-bodies, so that the same cannot turn therein. Furthermore, where skate-wheels are kept in stock or are taken off from skates it is essential that the ball-casings should be prevented from falling out of place in the skate-bodies. In prior constructions, as shown, for example, in patent to Daniel, No. 352,739, of November 16, 1886, it has been customary to press or secure the ball-casings in the skate-wheels with a tight driving fit. This practice I have found to be objectionable, as a considerable number of skate-wheels are cracked or weakened in manufacture, and even when these parts are put together with a driving fit the ball-casings are apt to work loose on account of the shrinkage of the wheel-body.

In assembling a skate-wheel of my construction I preferably make the bushing an easy fit for the skate-body and fit the ball-casings to the bushing with a tight driving fit, so that when the ball-casings are pressed or driven into place the bushing will be slightly expanded inside of the wheel-body. The bushings are preferably long enough to extend slightly from the face of the skate-wheels, and to exclude dust from the bearings I preferably provide the axles with dish-shaped dust-washers, which fit over the ends of the bushings. To lock the bushing and its ball-casings in the skate-wheel, I preferably notch the ends of the ball-casings and bushing, and riveted on opposite sides of the wheels I employ locking-washers having tongues engaging the notches in the bushings and ball-casings.

Referring to the drawings and in detail, A designates the foot-plate or body portion of a roller-skate constructed according to my invention. Riveted onto the under side of the footpiece, preferably with cushions B, of leather or other soft material, interposed between them and the foot-plate, are brackets or hangers C. Journaled in the brackets or hangers C are rockers D. The rockers are preferably journaled in their hangers by means of integral spurs *d*, extending from their upper ends, and by pivot-screws *e*, which are threaded into the brackets to engage sockets in the lower end of the rockers. The rockers D are normally held in alinement by means of rubber cushions or by springs in the ordinary manner. Secured in or carried by the rocker-pieces D are the studs or axles 10, having dust-washers 12 and ball-cones 11 secured thereon. Secured on the outer ends of the axles 10 are adjustable ball-cones 20, which may be locked in place by nuts 21, washers 22, and dust-washer 12.

The skate-wheels which I employ preferably comprise annular wheels or skate-bodies 13, fitting into each of which is a bushing 14. Driven into the bushings 14 and preferably separated from each other by a spacing-washer 16 are ball-casings 15. The bushings 14, as before explained, are first fitted loosely into the skate-wheels, and when the ball-casings are driven therein these bushings are slightly expanded, so as to then fit tightly in place in the skate-wheels. The bushings are preferably long enough to extend a short distance from the face of the skate-wheels, and in order to lock a bushing and its ball-casings in position in each skate-wheel the ends of the bushing and its ball-casings are notched transversely, as at 17.

Secured on opposite faces of the skate-wheel and preferably riveted together through the wheel-body are locking-washers 18, having inwardly-projecting tongues 19 for engaging the notches 17.

The dust-washers 12, which fit slightly over the ends of the bushings 14, I have found to be an efficient means for excluding dust from the bearings, and by the construction of skate-wheel described I have provided a wheel in which the ball-casings are accurately centered with respect to the wheel and are rigidly supported, so that the wheels are not liable to run out of true even when used for a long time. Furthermore, by this form of skate-wheel I have provided a construction in which the ball-casings are locked in position, so that they cannot work loose or be pulled out from the skate-wheels.

I am aware that changes may be made in the construction of my roller-skate by those who are skilled in the art without departing from the scope of my invention as expressed in the claim and that the form of skate-wheel herein described may be modified by skilled mechanics and may be used in connection with skates of different construction from that herein illustrated. I do not wish, therefore, to be limited to the forms which I have herein shown and described; but What I do claim, and desire to secure by Letters Patent of the United States, is—

As an article of manufacture, a skate-wheel comprising a wheel-body 13, a bushing 14 fitting therein, a spacing-washer 16 and ball-casings 15 fitting into said bushing, and locking-washers 18 riveted together through said skate-wheel and having inwardly-extending tongues 19 for engaging notches 17 in the bushing and ball-casings, substantially as described.

In testimony whereof I have hereunto set my hand in the presence of two subscribing witnesses.

OTIS W. EVERETT.

Witnesses:
LOUIS W. SOUTHGATE,
PHILIP W. SOUTHGATE.